United States Patent
Hane

(10) Patent No.: US 9,474,678 B2
(45) Date of Patent: Oct. 25, 2016

(54) PUSHCART

(71) Applicant: Murata Manufacturing Co., Ltd., Kyoto (JP)

(72) Inventor: Yoshitaka Hane, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/071,806

(22) Filed: Mar. 16, 2016

(65) Prior Publication Data

US 2016/0193103 A1    Jul. 7, 2016

Related U.S. Application Data

(63) Continuation of application No. PCT/JP2014/074036, filed on Sep. 11, 2014.

(30) Foreign Application Priority Data

Sep. 17, 2013  (JP) ................................ 2013-191841
Jun. 13, 2014  (JP) ................................ 2014-122423

(51) Int. Cl.
  *A61H 3/04*  (2006.01)
  *B62B 3/00*  (2006.01)
  *A61H 3/00*  (2006.01)

(52) U.S. Cl.
  CPC . *A61H 3/04* (2013.01); *B62B 3/00* (2013.01); *A61H 2003/001* (2013.01);
  (Continued)

(58) Field of Classification Search
  CPC ............. A61H 3/04; A61H 2003/001; A61H 2003/002; A61H 2003/043; A61H 2201/1633; A61H 2201/1635; A61H 2201/5007; A61H 2201/5061; A61H 2201/5069; B62B 3/00

USPC .......................................................... 701/48
See application file for complete search history.

(56) References Cited

U.S. PATENT DOCUMENTS 3,712,706 A * 1/1973 Stamm ................... G02B 5/124
                                                            359/530
4,636,077 A * 1/1987 Nomura .............. G03F 7/70408
                                                            356/400

(Continued)

FOREIGN PATENT DOCUMENTS

JP   2010-125221 A   6/2010
WO   2012114597 A1   8/2012

OTHER PUBLICATIONS

Written Opinion for PCT/JP2014/074036 dated Dec. 22, 2014.

(Continued)

*Primary Examiner* — McDieunel Marc
*Assistant Examiner* — James E Stroud
(74) *Attorney, Agent, or Firm* — Pearne & Gordon LLP

(57) ABSTRACT

A pushcart includes a main body, a pair of main wheels, a supporter, an auxiliary wheel, a blocking unit, a switching lever, a slope angle sensor, a gyrosensor, a driver unit, and a supporter rotary encoder. The supporter rotary encoder detects an intersecting angle which is an angle formed by the main body and the supporter, and outputs the detected result to a controller. The gyrosensor detects an angular velocity of the main body in a pitch direction and outputs the detected result to the controller. The controller performs inverted pendulum control in a first control mode based on the detected results of the gyrosensor and the supporter rotary encoder. The controller performs inverted pendulum control in a second control mode based on the detected result of the gyrosensor.

16 Claims, 15 Drawing Sheets

(52) U.S. Cl.
CPC .. *A61H 2003/002* (2013.01); *A61H 2003/043* (2013.01); *A61H 2201/1633* (2013.01); *A61H 2201/1635* (2013.01); *A61H 2201/5007* (2013.01); *A61H 2201/5061* (2013.01); *A61H 2201/5069* (2013.01)

(56) References Cited

U.S. PATENT DOCUMENTS 4,669,942 A * 6/1987 Isao ..................... B65H 67/064
 198/487.1

2013/0306120 A1 11/2013 Fukunaga et al.
2016/0221595 A1* 8/2016 Hane ........................ A61H 3/04

OTHER PUBLICATIONS

International Search report for PCT/JP2014/074036 dated Dec. 22, 2014.
English translation of Written Opinion for PCT/JP2014/074036 dated Dec. 22, 2014.

* cited by examiner

PUSHCART

BACKGROUND

Technical Field

The present disclosure relates to pushcarts that include wheels, and drive and control the stated wheels.

There are pushcarts that drive and control wheels while performing inverted pendulum control. For example, Patent Document 1 discloses a walking frame that includes a pair of wheels, a driver unit for driving the pair of wheels, a main body that is supported in a rotatable manner in a pitch direction with respect to the pair of wheels, an auxiliary wheel that is supported in a rotatable manner in the pitch direction with respect to the main body, a gyrosensor for detecting an angular velocity of the main body in the pitch direction, and a supporter angle encoder for detecting an intersecting angle formed by the main body and a supporter. A holding portion is provided at an end of the main body on the opposite side to the pair of wheels.

A user such as an aged person, a disabled person, or the like holds the holding portion from a side opposite to the auxiliary wheel (that is, with the auxiliary wheel being a front wheel and the pair of wheels being rear wheels) and moves the walking frame on a ground surface in a travelling direction. The walking frame performs inverted pendulum control in which the rotation of the pair of wheels is controlled by the driver unit, thereby assisting the user in walking.

Patent Document 1: International Publication No. WO 2012/114597

BRIEF SUMMARY

For example, in the case where there is a large step in front of a user in the travelling direction, the user may raise only the auxiliary wheel (front wheel) of the walking frame from the ground surface so as to negotiate the step.

However, in the inverted pendulum control, the rotation of a pair of wheels (rear wheels) is controlled so that an angle change of the main body becomes 0. As such, in the case where the user attempts to raise only the auxiliary wheel (front wheel) of the walking frame from the ground surface, there is a possibility that the pair of wheels (rear wheels) rotates and brings about unintended movement of the walking frame.

Accordingly, the present disclosure provides a pushcart that prevents unintended movement thereof in the case where a user attempts to raise a front wheel thereof from a ground surface.

A pushcart according to the present disclosure includes a first wheel, a main body that is supported in a rotatable manner in a pitch direction with respect to the first wheel, and a first driver unit for driving the first wheel. The pushcart according to the present disclosure further includes a supporter that is supported in a rotatable manner in the pitch direction with respect to the main body or a rotational shaft of the first wheel, a second wheel that is supported by the supporter in a rotatable manner on a front side relative to the first wheel in a travelling direction of the supporter being moved with the rotation of the first wheel, an angle change detection unit for detecting an angle change in a slope angle of the main body in the pitch direction, and an intersecting angle detection unit for detecting an intersecting angle formed by the main body and the supporter. A holding portion is provided at one end of the main body. The pitch direction is a direction of a rotating movement around an axis that passes through the main body and is parallel to an axis of rotation of the first and second wheels.

Further, the pushcart according to the present disclosure includes a controller having a first control mode for controlling the first driver unit so that an angle change of the main body in the pitch direction becomes 0 based on output of the intersecting angle detection unit and a second control mode for controlling the first driver unit so that the angle change of the main body in the pitch direction becomes 0 based on output of the angle change detection unit, and a switching unit for switching between the first control mode and the second control mode.

In this configuration, a user holds the holding portion or places the forearms or the like on the holding portion, and moves the pushcart in a forward/backward direction on a ground surface. The pushcart performs inverted pendulum control in the first control mode to assist the user in walking.

In the case where the user attempts to raise only the second wheel of the pushcart from the ground surface so as to negotiate a step, the user switches from the first control mode to the second control mode by the switching unit. With this, the controller switches the control mode from the first control mode to the second control mode. In addition, the user rotates the supporter in the pitch direction. This causes the second wheel supported by the supporter to rotate in the pitch direction as well, whereby the pushcart is set in a tipping state in which only the second wheel as a front wheel is raised from the ground surface. In the tipping state, the controller performs the inverted pendulum control of the second control mode based on the output of the angle change detection unit to assist the user in walking.

After having set the pushcart in the tipping state, the user moves the pushcart in the travelling direction until the second wheel reaches the upper side of the step. Then, upon the second wheel having reached the upper side of the step, the user holds the holding portion and makes the first wheel ride over the step.

When the user attempts to raise only the second wheel of the pushcart from the ground surface, a value of the intersecting angle formed by the main body and the supporter, which is outputted from the intersecting angle detection unit, is changed.

However, in the inverted pendulum control of the second control mode, the controller controls the rotation of the first wheel based on the output of the angle change detection unit so that the angle change of the main body becomes 0. In other words, in the inverted pendulum control of the second control mode, the controller does not perform the inverted pendulum control based on the output of the intersecting angle detection unit.

As such, when the user attempts to raise only the second wheel of the pushcart from the ground surface, the pushcart will not move unintendedly due to the rotation of the first wheel based on the output of the intersecting angle detection unit.

Therefore, according to the above pushcart, the pushcart can be prevented from unintended movement when the user attempts to raise the second wheel from the ground surface.

Further, the controller can control the first driver unit based on both the output of the intersecting angle detection unit and the output of the angle change detection unit so that the angle change of the main body in the pitch direction becomes 0 in the first control mode.

With this configuration, the first control mode in which the inverted pendulum control is performed based on both the output of the intersecting angle detection unit and the output of the angle change detection unit can perform a high-precision inverted pendulum control in comparison with the second control mode in which the inverted pendulum control is performed based on the output of the angle change detection unit.

The switching unit can be jointed to an end portion of the supporter on a side where the supporter is supported by the main body or the rotational shaft of the first wheel.

In this configuration, when a user attempts to negotiate a step by raising only the second wheel of the pushcart from the ground surface, the user pushes down the switching unit. This makes the controller switch the control mode from the first control mode to the second control mode. In addition, by pushing down the switching unit, an end portion of the supporter on a side where the supporter is not supported by the rotational shaft of the first wheel or the main body rotates in the pitch direction. Because of this, the second wheel provided at the stated end portion also rotates in the pitch direction, whereby the pushcart is set in a tipping state in which only the second wheel is raised from the ground surface.

A blocking unit can be included for preventing the supporter from rotating with an angle which is no less than a predetermined angle in the pitch direction with respect to the main body or the rotational shaft of the first wheel.

In this configuration, after the second wheel has reached the upper side of the step, the supporter is rotated until the blocking unit prevents the rotation thereof while the second wheel supported by the supporter serving as a fulcrum, whereby the user can lift the first wheel onto the upper side of the step.

Further, a second driver unit for actively rotating the supporter in the pitch direction can be included, and that the controller command the second driver unit to rotate the supporter in the pitch direction when switching to the second control mode is carried out by the switching unit.

In this configuration, in the case where a user attempts to raise only the second wheel of the pushcart from the ground surface so as to negotiate a step, the user operates the switching unit. Through this, the controller switches the control mode from the first control mode to the second control mode and rotates the supporter in the pitch direction through the second driver unit. That is to say, the pushcart is set in a tipping state in which only the second wheel as a front wheel is raised from the ground surface.

As such, according to the pushcart configured as discussed above, a user-friendly pushcart is realized because the supporter is automatically rotated in the pitch direction by the operation of the switching unit.

Further, the pushcart may include a step detection unit for detecting a step, and the switching unit may be so embodied as to carry out switching between the first control mode and the second control mode based on a detected result by the step detection unit. In this case, the switching between the first control mode and the second control mode can be automatically carried out.

According to the present disclosure, in the case where a user attempts to raise the second wheel of the pushcart from a ground surface, unintended movement of the pushcart can be prevented.

DETAILED DESCRIPTION

Hereinafter, a pushcart 100 according to a first embodiment of the present disclosure will be described.

Figure 1:
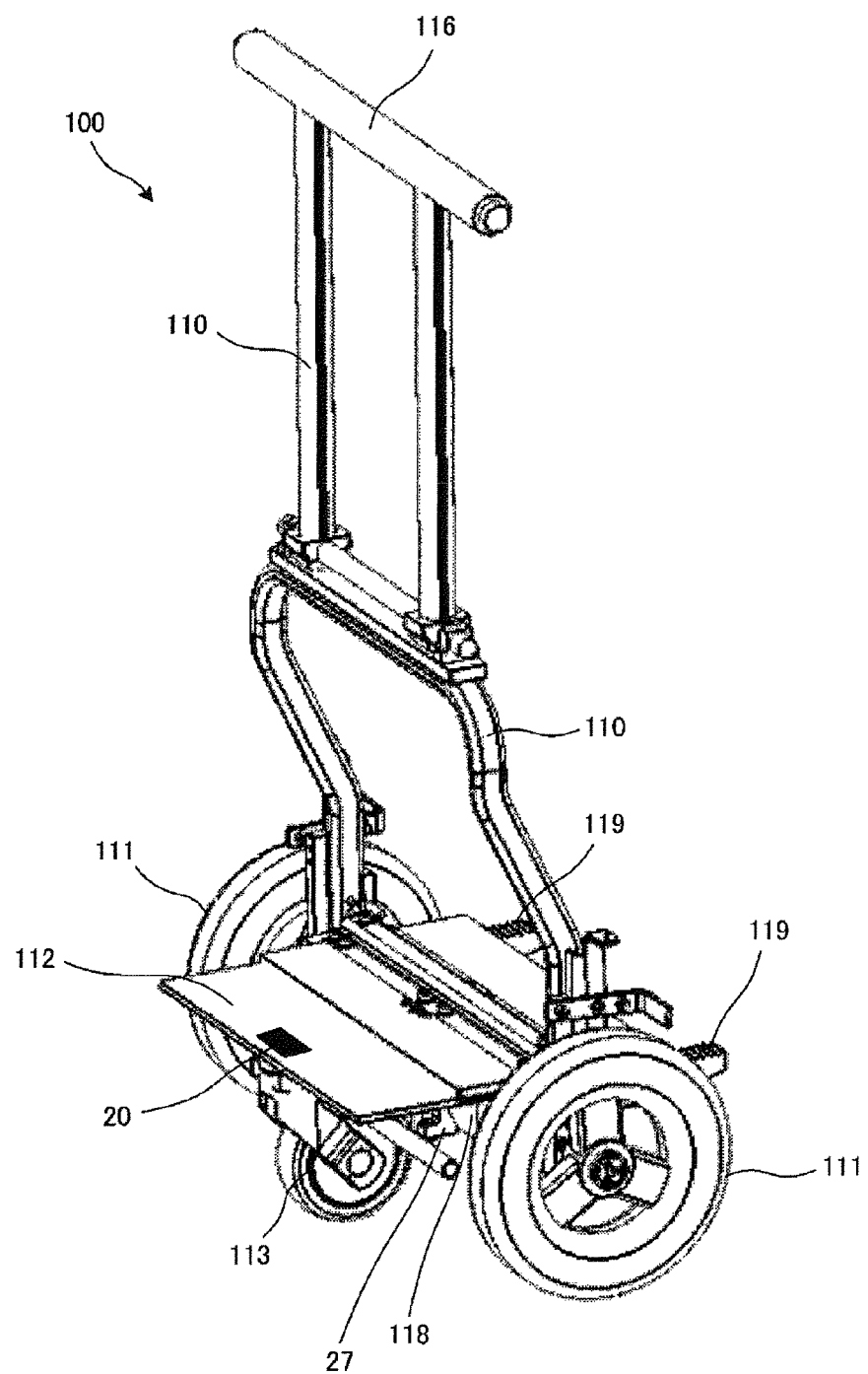
FIG. 1 is an external appearance perspective view of a pushcart 100 according to a first embodiment of the present disclosure.
Figure 2:
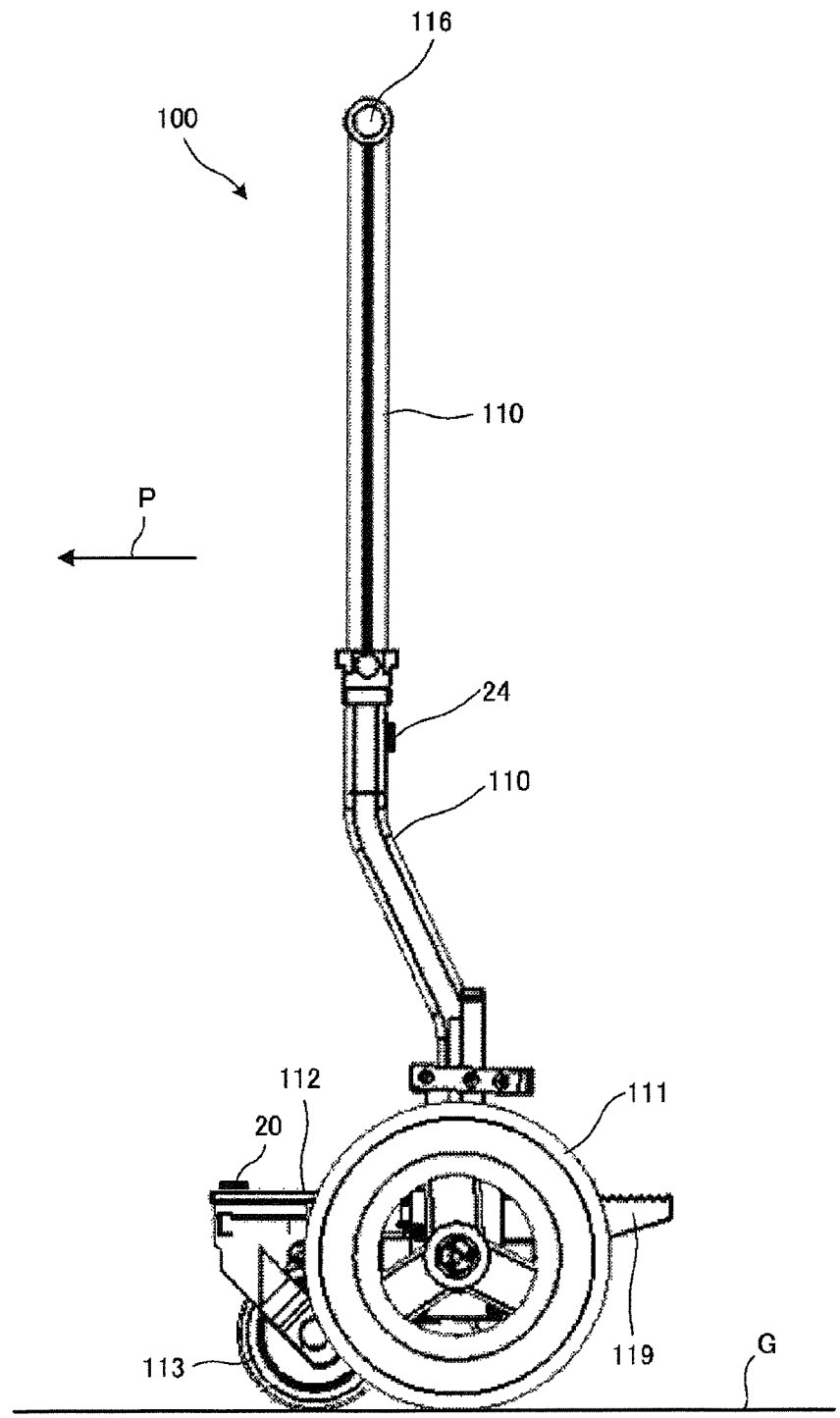
FIG. 2 is a side view of the pushcart 100 shown in FIG. 1.
Figure 3:
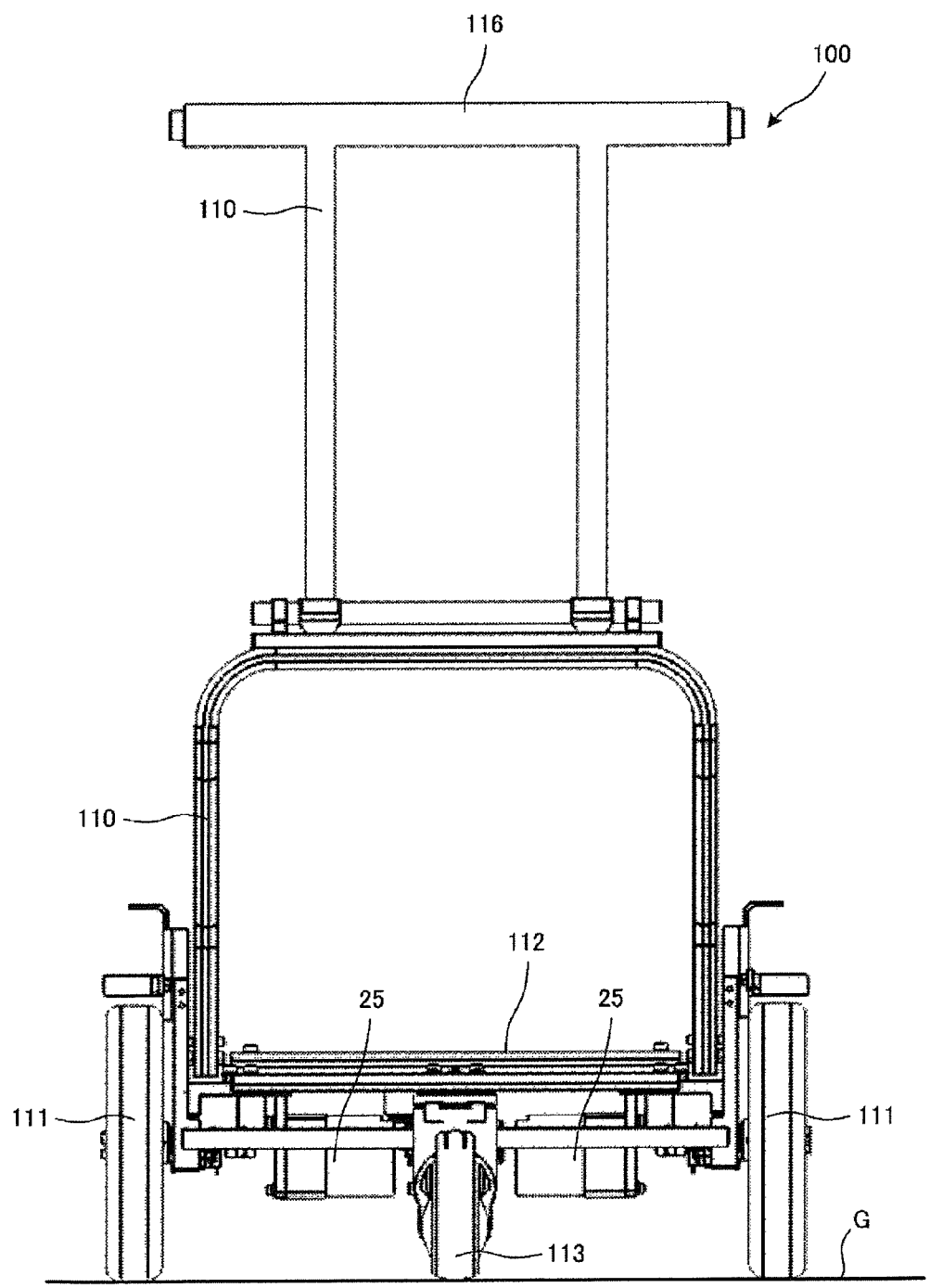
FIG. 3 is a front view of the pushcart 100 shown in FIG. 1.
Figure 4:
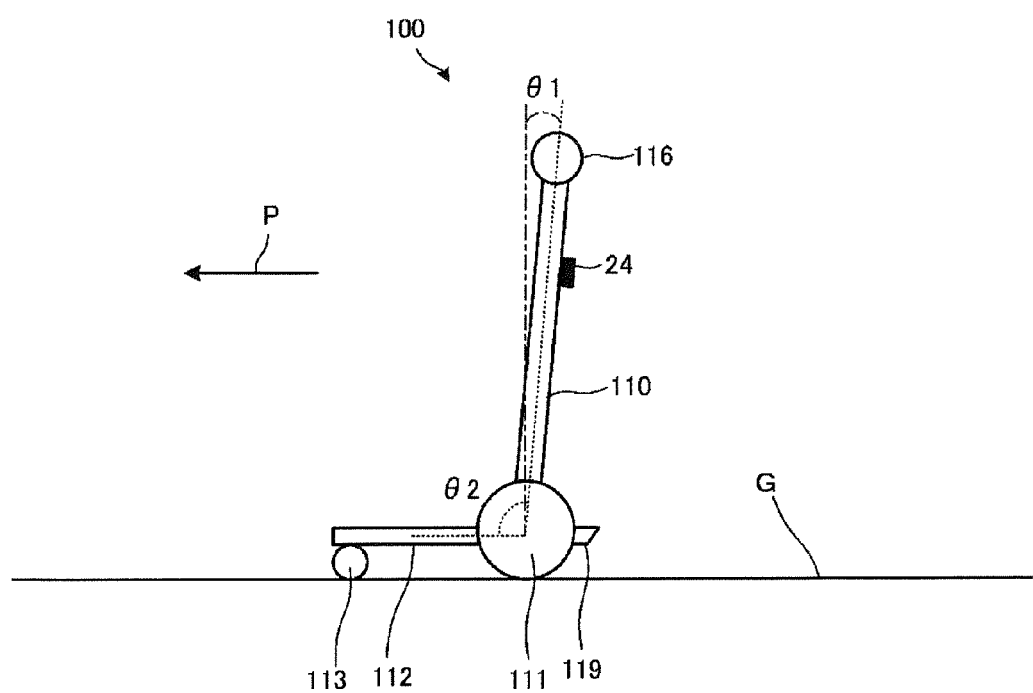
FIG. 4 is a schematic side view of the pushcart 100 shown in FIG. 1.

FIG. 1 is an external appearance perspective view of a pushcart 100 according to a first embodiment of the present disclosure. FIG. 2 is a side view of the pushcart 100 shown in FIG. 1. FIG. 3 is a front view of the pushcart 100 shown in FIG. 1. FIG. 4 is a schematic side view of the pushcart 100 shown in FIG. 1.

The pushcart 100 includes a main body 110, a pair of main wheels 111, a supporter 112, an auxiliary wheel 113, a blocking unit 118, a switching lever 119, a slope angle sensor 20, a gyrosensor 24, a driver unit 25, and a supporter rotary encoder 27.

In this embodiment, the pushcart 100 is a walking frame for assisting a user such as an aged person, a disabled person, or the like in walking. In addition, the pushcart 100 is used, for example, as a pushchair, a shopping cart, or the like.

Here, the main wheels 111 correspond to "first wheel" of the present disclosure. The auxiliary wheel 113 corresponds to "second wheel" of the present disclosure. The switching lever 119 corresponds to "switching unit" of the present disclosure. The gyrosensor 24 corresponds to "angle change detection unit" of the present disclosure. The driver unit 25 corresponds to "first driver unit" of the present disclosure. The supporter rotary encoder 27 corresponds to "intersecting angle detection unit" of the present disclosure.

The pair of main wheels 111 is attached to a drive shaft so as to oppose each other and rotates in synchronization with each other. A single auxiliary wheel 113 is supported by the supporter 112 in a rotatable manner on a front side relative to the main wheels 111 in a travelling direction P of the pushcart 100. As such, in the pushcart 100, the pair of main wheels 111 refers to rear wheels while the single auxiliary wheel 113 refers to a front wheel. Note that the diameter of each of the main wheels 111 is longer than the diameter of the auxiliary wheel 113. The driver unit 25 is provided on a bottom surface of the supporter 112 and drives the pair of main wheels 111.

The pair of main wheels 111 can be separately driven and rotated. Although an example of the main wheels 111 being a two-wheeled type is cited in the present embodiment, the disclosure is not limited to the two-wheeled type. Likewise, although an example of the auxiliary wheel 113 being a unicycle type is cited in the present embodiment, the disclosure is not limited to the unicycle type.

The main body 110 is a frame-like member extending in the vertical direction. The gyrosensor 24 is installed on the main body 110. One end of the main body 110 is supported in a rotatable manner in the pitch direction with respect to the pair of main wheels 111. A holding portion 116 formed in a circular cylinder shape is provided at the other end of the main body 110 on the opposite side to the main wheels 111.

The supporter 112 is a plate-like member extending parallel to a horizontal ground surface G in the travelling direction of the pushcart 100. The slope angle sensor 20 is installed on an upper surface of the supporter 112. The supporter 112 is supported in a rotatable manner in the pitch direction with respect to a rotational shaft of the pair of main wheels 111.

The switching lever 119 is jointed to one end portion of the supporter 112 on a side where the supporter 112 is supported by the main wheels 111. The switching lever 119 carries out switching between a first control mode and a second control mode, details of which will be explained later. The auxiliary wheel 113 is provided under the other end portion of the supporter 112 on a side where the supporter 112 is not supported by the main wheels 111. With this, both the main wheels 111 and the auxiliary wheel 113 make contact with the ground surface G.

Further, there are provided the supporter rotary encoder 27 to be explained later in detail and the blocking unit 118 on the bottom surface of the supporter 112. The blocking unit 118 prevents the supporter 112 from rotating with an angle which is no less than a predetermine angle (for example, 30 degrees) in the pitch direction with respect to the rotational shaft of the pair of main wheels 111.

In the present embodiment, although the supporter 112 is supported in a rotatable manner in the pitch direction with respect to the rotational shaft of the pair of main wheels 111, the disclosure is not limited thereto. In actuality, the supporter 112 may be supported in a rotatable manner in the pitch direction with respect to the main body 110.

There is provided a user interface (a user I/F 28 shown in FIG. 5 to be explained later) on the holding portion 116. A power switch of the pushcart 100 and the like are provided in the user I/F 28.

In this configuration, a user holds the holding portion 116 from reverse side of the auxiliary wheel 113 or places the forearms or the like on the holding portion 116, and moves the pushcart 100 in the forward/backward direction on the ground surface G.

Next, a configuration and basic operation of the pushcart 100 will be described.

Figure 5:
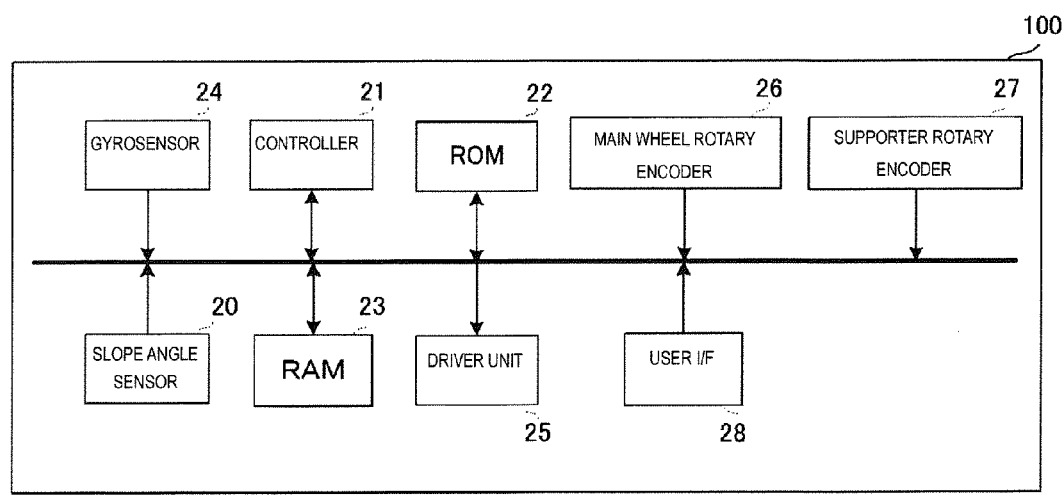
FIG. 5 is a block diagram illustrating a hardware configuration of the pushcart 100 shown in FIG. 1.

FIG. 5 is a block diagram illustrating a hardware configuration of the pushcart 100 shown in FIG. 1. The pushcart 100 includes the slope angle sensor 20, a controller 21, a ROM 22, a RAM 23, the gyrosensor 24, the driver unit 25, a main wheel rotary encoder 26, the supporter rotary encoder 27, and the user I/F 28.

The controller 21 is a functional unit, for integrally controlling the pushcart 100, which reads out programs stored in the ROM 22 and loads those programs in the RAM 23, thereby realizing various types of operations.

The main wheel rotary encoder 26 detects a rotational angle of the main wheels 111 and outputs the detected result to the controller 21. The controller 21 differentiates the value of the rotational angle of the main wheels 111 inputted from the main wheel rotary encoder 26 so as to calculate an angular velocity of the main wheels 111.

The supporter rotary encoder 27 detects an intersecting angle which is an angle formed by the main body 110 and the supporter 112, and outputs the detected result to the controller 21.

The slope angle sensor 20 detects a slope angle of the supporter 112 relative to the vertical direction and outputs the detected result to the controller 21.

The gyrosensor 24 detects an angular velocity of the main body 110 in the pitch direction (rotational direction about the rotational shaft of the main wheels 111 in FIG. 1) and outputs the detected result to the controller 21.

Although an example in which the supporter rotary encoder 27 is used as a method for detecting the intersecting angle is cited in the present embodiment, the disclosure is not limited thereto and any other types of sensor may be used.

Likewise, in the present embodiment, although an example in which the gyrosensor 24 is used as a method for detecting an angle change in the slope angle of the main body 110 in the pitch direction, the disclosure is not limited thereto. In the case where a slope angle sensor (not shown) is provided instead of the gyrosensor 24 in the main boy 110, a slope angular velocity of the main body 110 is calculated through differentiating the slope angle of the main body 110 detected by the stated slope angle sensor. Further, an acceleration sensor can also be used, and any other type of sensor may be used.

The controller 21 has the first control mode and the second control mode.

To be more specific, in the first control mode, the controller 21 performs inverted pendulum control in which the main wheels 111 are rotated by the driver unit 25 based on the detected results of the gyrosensor 24 and the supporter rotary encoder 27 so that the angle change of the main body 110 in the pitch direction becomes 0 and the slope angle of the main body 110 relative to the vertical direction has a target value (for example, 0 or nearly 0).

Meanwhile, in the second control mode, the controller 21 performs inverted pendulum control in which the main wheels 111 are rotated by the driver unit 25 based on the detected result of the gyrosensor 24 so that the angle change of the main body 110 in the pitch direction becomes 0 and the slope angle of the main body 110 relative to the vertical direction has a target value (for example, 0 or nearly 0).

Hereinafter, details of the inverted pendulum control will be described.

Figure 6:
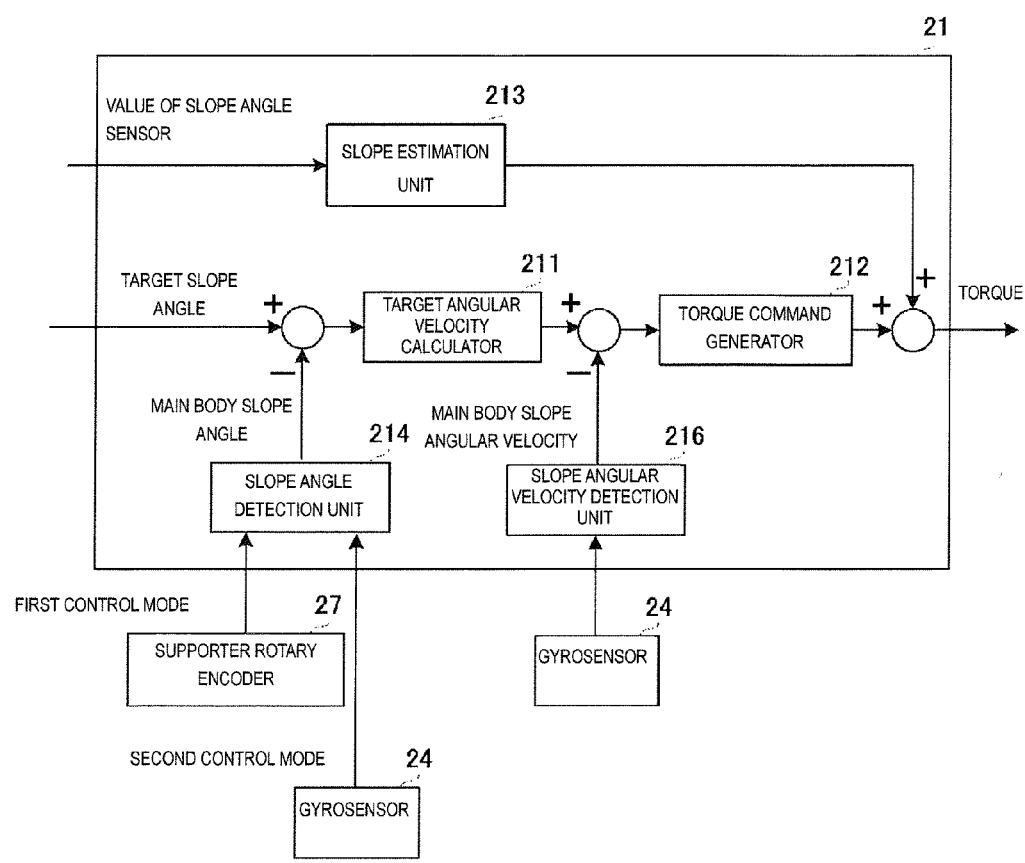
FIG. 6 is a control block diagram illustrating a configuration of a controller 21 shown in FIG. 5.

FIG. 6 is a control block diagram illustrating a configuration of the controller 21 shown in FIG. 5.

The controller 21 includes a target angular velocity calculator 211, a torque command generator 212, a slope estimation unit 213, a slope angle detection unit 214, and a slope angular velocity detection unit 216.

The slope angle detection unit 214 calculates a current slope angle $\theta 1$ of the main body 110 from an intersecting angle θ2 which is formed by the main body 110 and the supporter 112 and the value of which is outputted from the supporter rotary encoder 27 in the first control mode (see FIG. 4).

To be more specific, as discussed before, the supporter 112 is so supported by the rotational shaft of the main wheels 111 as to be parallel to the horizontal ground surface G. As such, in the case of the intersecting angle θ2 being 90 degrees, the slope angle θ1 of the main body 110 is 0 degree. The slope angle detection unit 214 estimates the current slope angle θ1 of the main body 110 while considering that the main body 110 is slanted backward in the travelling direction P in the case of the intersecting angle θ2 becoming larger and that the main body 110 is slanted forward in the travelling direction P in the case of the intersecting angle θ2 becoming smaller.

Meanwhile, the slope angle detection unit 214 calculates the current slope angle θ1 of the main body 110 by integrating the output value (slope angular velocity) of the gyrosensor 24 in the second control mode.

Subsequently, the target angular velocity calculator 211 inputs a differential value between a predetermined target slope angle (in this case, a slope angle slanted backward a little more than 0 degree relative to the vertical direction) and the current slope angle θ1 of the main body 110 calculated by the slope angle detection unit 214, and calculates such a slope angular velocity of the main body 110 that will make the above differential value become 0.

The slope angular velocity detection unit 216 calculates the slope angular velocity of the main body 110 based on the output of the gyrosensor 24 in both the first and second control modes.

In the present embodiment, although the current slope angular velocity of the main body 110 is inputted from the gyrosensor 24, the disclosure is not limited thereto. In actuality, only in the case of the first control mode, the slope angular velocity detection unit 216 may differentiate the value of the intersecting angle θ2 formed by the main body 110 and the supporter 112, which is inputted from the supporter rotary encoder 27, so as to calculate the current slope angular velocity of the main body 110.

Subsequently, the torque command generator 212 inputs a differential value between the slope angular velocity having been calculated by the target angular velocity calculator 211 and the current slope angular velocity of the main body 110 having been calculated by the slope angular velocity detection unit 216, and generates an application torque that will make the above differential value become 0.

Meanwhile, in accordance with a slope angle of the ground surface G which is estimated based on a value of the slope angle sensor 20, the slope estimation unit 213 calculates an offset torque for compensating gravitational torque generated due to the above slope angle of the ground surface G.

In this manner, the controller 21 adds the offset torque to the application torque calculated by the torque command generator 212, and outputs the added result to the driver unit 25.

The driver unit 25 may include a circuit that drives a motor for rotating the shaft being attached to the main wheels 111. The driver unit 25 rotates the main wheels 111 by applying the torque, which is inputted from the controller 21, to the motor of the main wheels 111.

As discussed thus far, the pushcart 100 performs inverted pendulum control in the first and second control modes to maintain a state in which the main body 110 takes a posture upright in the vertical direction. As such, even in the case where a user holds the holding portion 116 and pushes the holding portion 116 in the forward direction, the main wheels 111 rotate so that the supporter 112 also moves in the forward direction, whereby the posture of the main body 110 is maintained to be constant.

Conversely, even in the case where the user holds the holding portion 116 and pulls the holding portion 116 in the backward direction, the main wheels 111 rotate so that the supporter 112 also moves in the backward direction, whereby the posture of the main body 110 is maintained to be constant. In this manner, the pushcart 100 performs inverted pendulum control in the first and second control modes so as to assist the user in walking.

The first control mode in which the inverted pendulum control is performed based on both the output of the gyrosensor 24 and the output of the supporter rotary encoder 27 is capable of performing a high-precision inverted pendulum control in comparison with the second control mode in which the inverted pendulum control is performed based on only the output of the gyrosensor 24.

Next, a case in which a user U attempts to raise only the auxiliary wheel 113 of the pushcart 100 from the ground surface G so as to negotiate a step S will be described.

Figure 7:
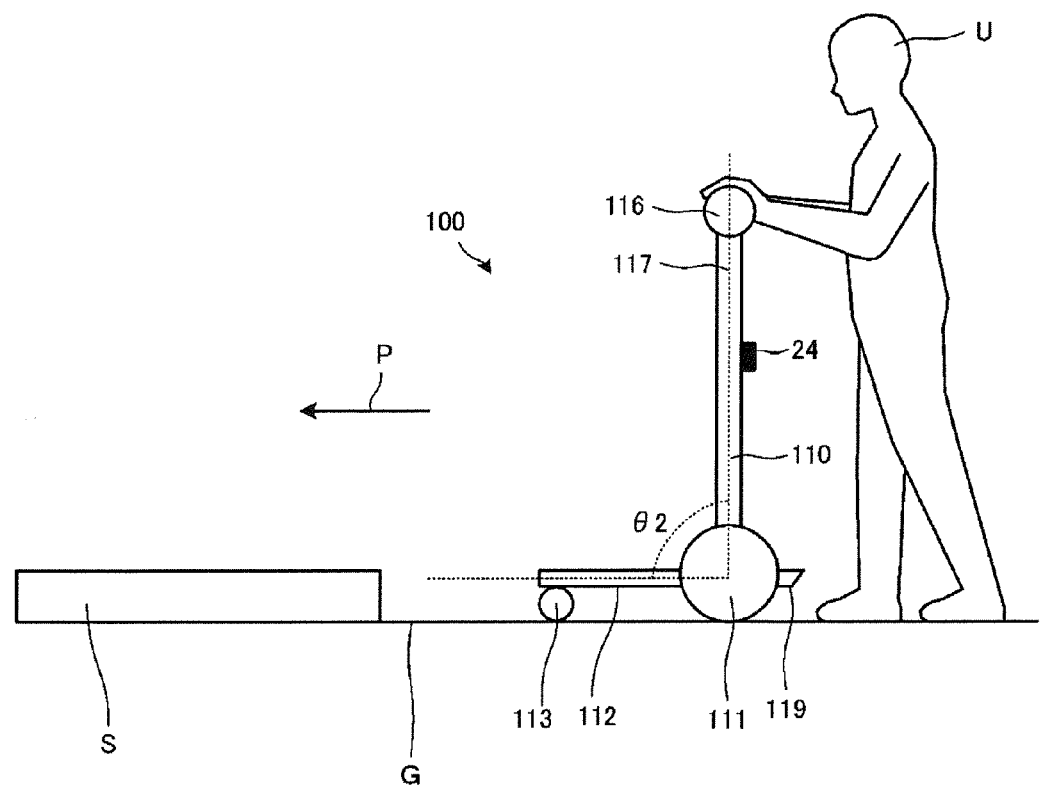
FIG. 7 is a schematic side view of the pushcart 100 when the pushcart 100 shown in FIG. 1 is assisting a user U in walking.
Figure 8:
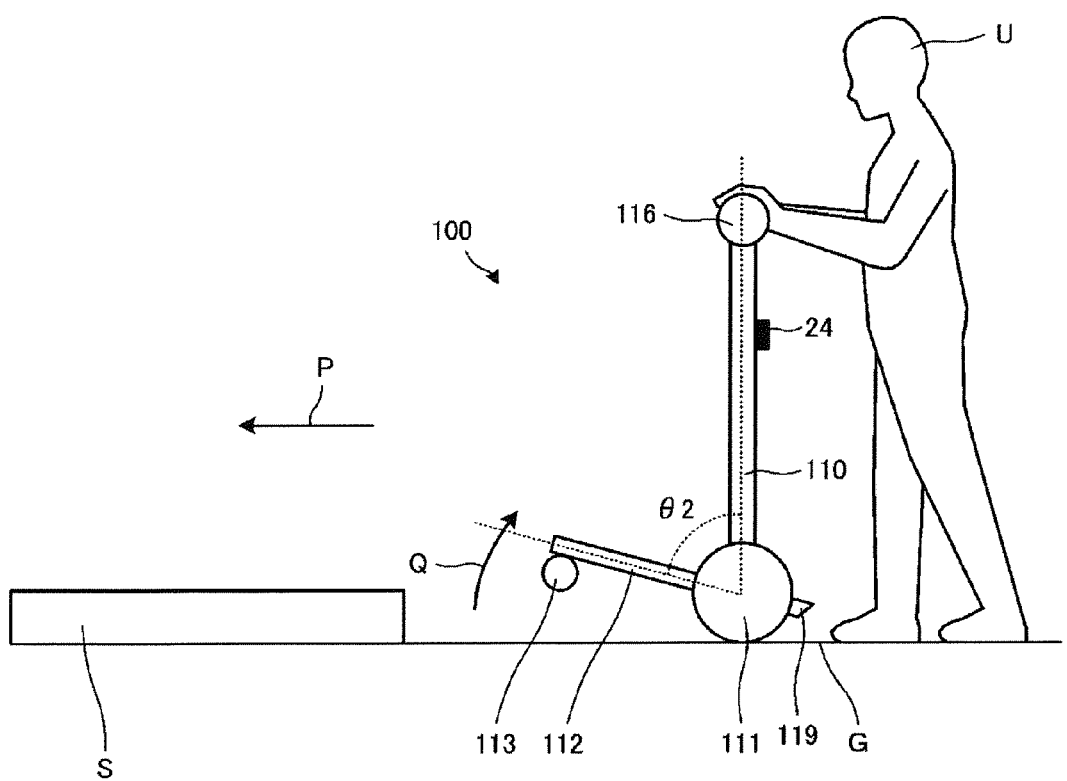
FIG. 8 is a schematic side view of the pushcart 100 shown in FIG. 1 at a tipping time.
Figure 9:
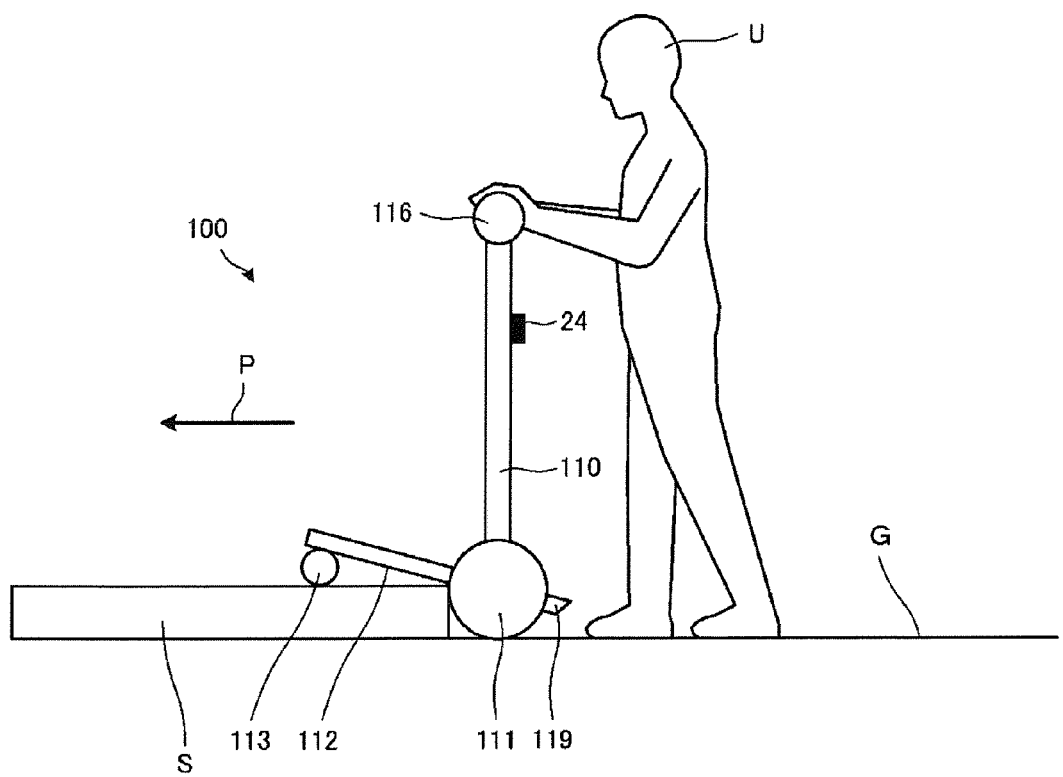
FIG. 9 is a schematic side view of the pushcart 100 shown in FIG. 1 when a front wheel thereof has negotiated a step S.
Figure 10:
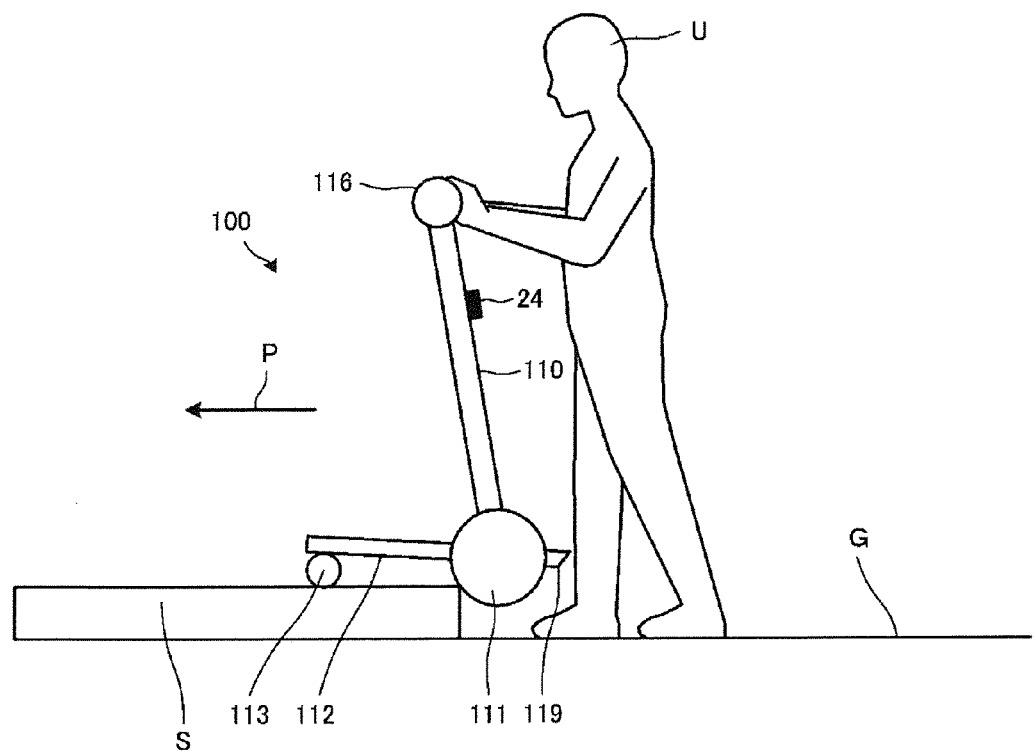
FIG. 10 is a schematic side view of the pushcart 100 shown in FIG. 1 when a rear wheel thereof negotiates the step S.
Figure 11:
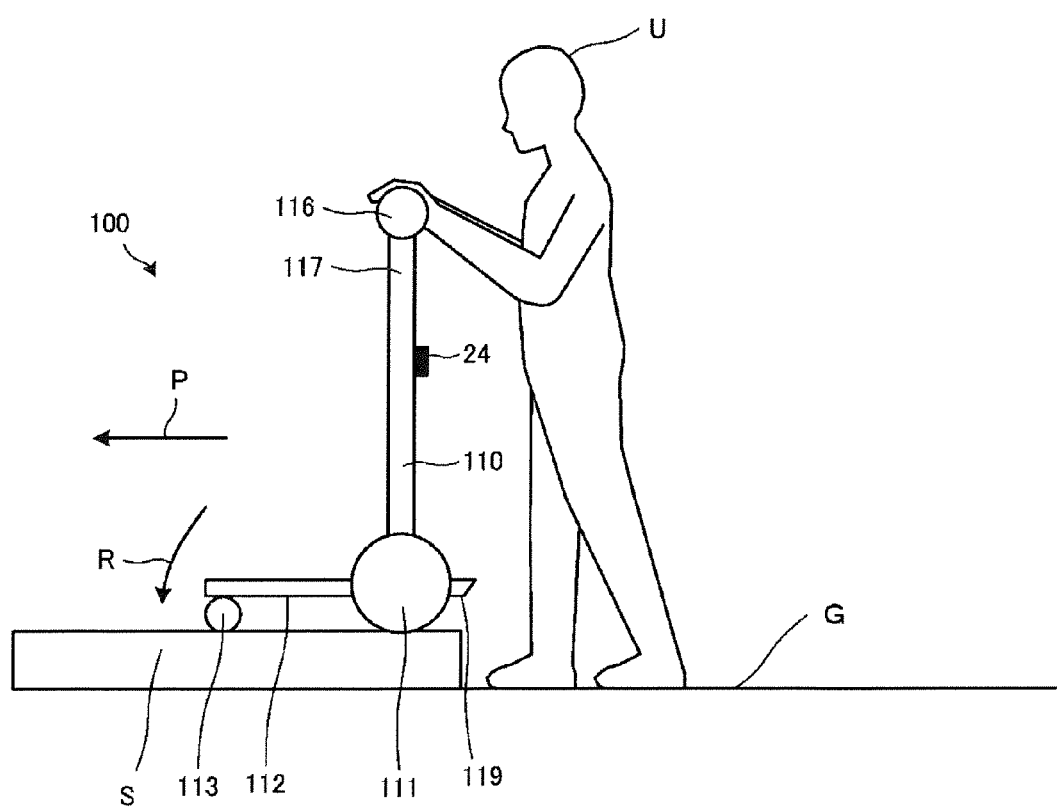
FIG. 11 is a schematic side view of the pushcart 100 shown in FIG. 1 when the front wheel and the rear wheel thereof have negotiated the step S.

FIG. 7 is a schematic side view of the pushcart 100 when the pushcart 100 shown in FIG. 1 is assisting the user U in walking. FIG. 8 is a schematic side view of the pushcart 100 shown in FIG. 1 at a tipping time. FIG. 9 is a schematic side view of the pushcart 100 shown in FIG. 1 when the front wheel thereof has negotiated the step S. FIG. 10 is a schematic side view of the pushcart 100 shown in FIG. 1 when the rear wheels thereof negotiate the step S. FIG. 11 is a schematic side view of the pushcart 100 shown in FIG. 1 when the front wheel and the rear wheels thereof have negotiated the step S.

In the pushcart 100, as discussed before, the pair of main wheels 111 refers to the rear wheels and the single auxiliary wheel 113 refers to the front wheel. Further, in the present embodiment, the height of the step S is defined to be larger in dimension than the radius of the main wheel 111.

As shown in FIG. 7, the user U nears a large step S in some case when walking in the travelling direction P with the assistance of the pushcart 100 in the first control mode. At this time, the pushcart 100 is assisting the user U in walking while performing the inverted pendulum control of the first control mode based on both the output of the gyrosensor 24 and the output of the supporter rotary encoder 27.

In the case where the user U attempts to raise only the auxiliary wheel 113 of the pushcart 100 from the ground surface G so as to negotiate the step S, the user U steps on the switching lever 119 and pushes down the stated switching lever 119. This makes the controller 21 switch the control mode from the first control mode to the second control mode. In addition, as shown in FIG. 8, with the switching lever 119 being pushed down, the other end portion of the supporter 112 on a side where the supporter 112 is not supported by the main wheels 111 rotates in a pitch direction Q. Because of this, the auxiliary wheel 113 supported by the other end portion thereof also rotates in the pitch direction Q, whereby the pushcart 100 is set in a tipping state in which only the auxiliary wheel 113 as the front wheel is raised from the ground surface G. In this tipping state, the controller 21 performs the inverted pendulum control of the second control mode based on only the output of the gyrosensor 24, thereby assisting the user U in walking.

After having set the pushcart 100 in the tipping state, the user U moves the pushcart 100 in the travelling direction P until the pair of main wheels 111 makes contact with the step S, as shown FIG. 9.

When the pair of main wheels 111 makes contact with the step S, the user U makes the pair of main wheels 111 negotiate the step S by making use of the lever rule, as shown in FIG. 10.

More specifically, as discussed earlier, the rotational angle of the supporter 112 is limited by the blocking unit 118 within a range of a predetermined angle (for example, 30 degrees). As such, the user U can lift the pair of main wheels 111 onto the step S by making the supporter 112 rotate to a maximum extent until the rotation thereof is prevented by the blocking unit 118 while making the auxiliary wheel 113 supported by the supporter 12 serve as a fulcrum.

As shown in FIG. 11, after the auxiliary wheel 113 and the pair of main wheels 111 have negotiated the step S, the user U lifts the switching lever 119 and returns it to its original state, and rotates the auxiliary wheel 113 in a pitch direction R. Through this, the tipping state of the pushcart 100 is resolved, and the auxiliary wheel 113 and the pair of main wheels 111 make contact with the upper surface of the step S. The controller 21 switches the control mode from the second control mode to the first control mode.

As such, the pushcart 100 performs the inverted pendulum control of the first control mode on the step S based on both the output of the gyrosensor 24 and the output of the supporter rotary encoder 27, thereby assisting the user U in walking.

Here, as shown in FIG. 8, in the case where the user U attempts to raise only the auxiliary wheel 113 of the pushcart 100 from the ground surface G, the value of the intersecting angle θ2 formed by the main body 110 and the supporter 112, which is outputted from the supporter rotary encoder 27, changes.

However, in the inverted pendulum control of the second control mode, the controller 21 controls the rotation of the pair of main wheels 111 based on only the output of the gyrosensor 24 so that the angle change of the main body 110 becomes 0. In other words, the controller 21 does not perform inverted pendulum control based on the output of the supporter rotary encoder 27 in the inverted pendulum control of the second control mode.

Because of this, in the case where the user U attempts to raise only the auxiliary wheel 113 of the pushcart 100 from the ground surface G, the pushcart 100 will not unintendedly move due to the rotation of the pair of main wheels 111 based on the output of the supporter rotary encoder 27.

Accordingly, with the pushcart 100, unintended movement of the pushcart 100 can be prevented when the user U attempts to raise the auxiliary wheel 113 from the ground surface G.

Hereinafter, a pushcart 200 according to a second embodiment of the present disclosure will be described.

Figure 12:
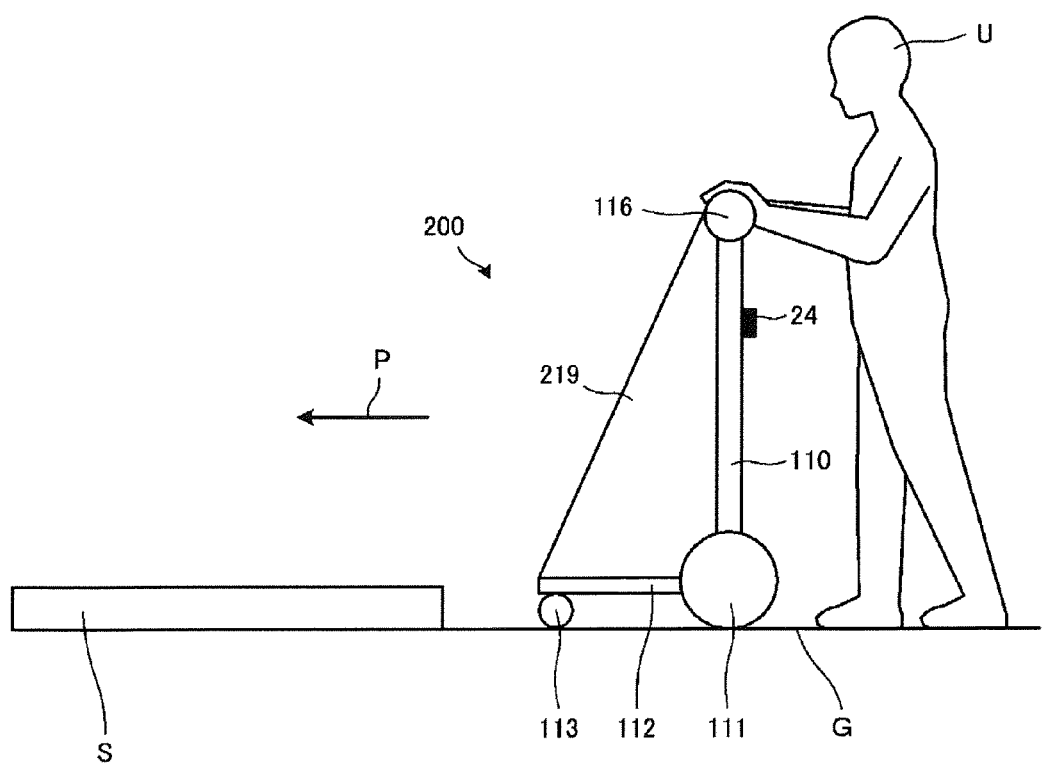
FIG. 12 is a schematic side view of a pushcart 200 according to a second embodiment of the present disclosure.

FIG. 12 is a schematic side view of the pushcart 200 according to the second embodiment of the present disclosure.

The pushcart 200 according to the second embodiment differs from the pushcart 100 according to the first embodiment in a point that a switching wire 219 is provided in place of the switching lever 119. One end of the switching wire 219 is connected to the holding portion 116 while the other end of the switching wire 219 is connected to the other end portion of the supporter 112 on the side where the supporter 112 is not supported by the main wheels 111. Since other constituent elements are the same as those of the pushcart 100, descriptions thereof are omitted herein.

In the present disclosure, in the case where the user U attempts to raise only the auxiliary wheel 113 of the pushcart 200 from the ground surface G so as to negotiate the step S, the user U pulls the switching wire 219 toward the user side from the holding portion 116 side. This makes the controller switch the control mode from the first control mode to the second control mode. Further, the other end portion of the supporter 112 on the side where the supporter 112 is not supported by the main wheels 111 is pulled by the switching wire 219 and rotated in the pitch direction. In other words, the pushcart 200 is set in a tipping state in which only the auxiliary wheel 113 as a front wheel is raised from the ground surface G, and inverted pendulum control is performed in the second control mode.

Accordingly, the pushcart 200 brings the same advantage as the pushcart 100.

Hereinafter, a pushcart 300 according to a third embodiment of the present disclosure will be described.

Figure 13:
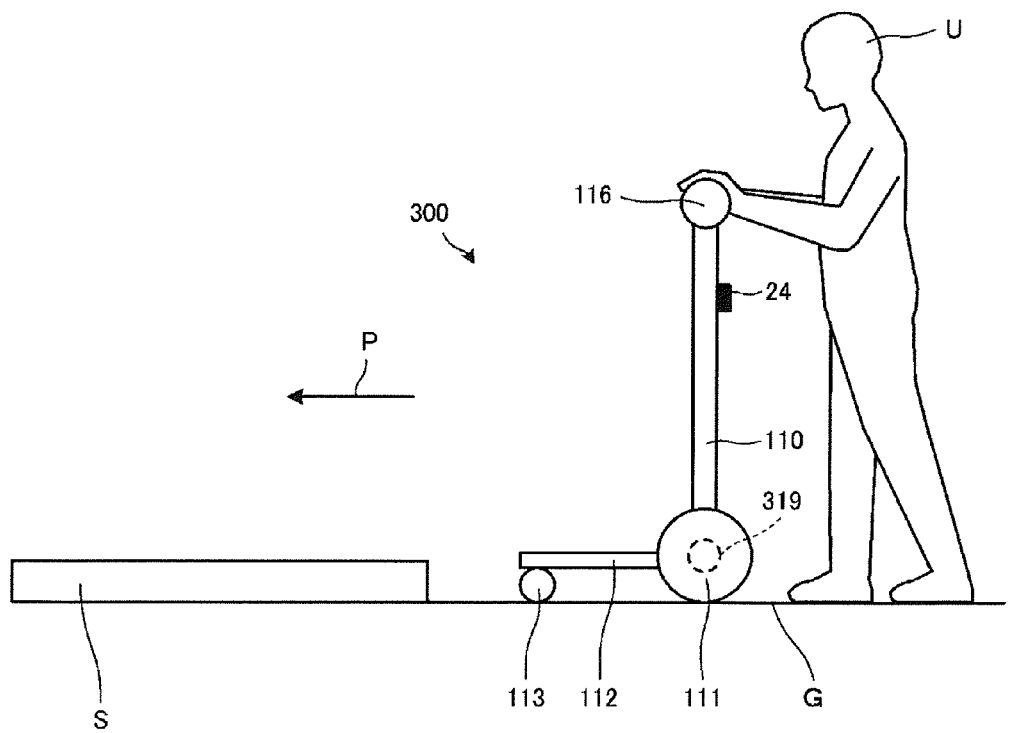
FIG. 13 is a schematic side view of a pushcart 300 according to a third embodiment of the present disclosure.

FIG. 13 is a schematic side view of the pushcart 300 according to the third embodiment of the present disclosure.

The pushcart 300 according to the third embodiment differs from the pushcart 100 according to the first embodiment in a point that a driver unit 319 and a mode-exchange switch are provided in place of the switching lever 119. The driver unit 319 corresponds to "second driver unit" of the present disclosure and the mode-exchange switch corresponds to "switching unit" of the present disclosure. Since other constituent elements are the same as those of the pushcart 100, descriptions thereof are omitted herein.

To be more specific, the driver unit 319 for actively rotating the supporter 112 in the pitch direction is provided in the supporter 112.

The mode-exchange switch to carry out switching between the first control mode and the second control mode is provided in the user I/F 28.

The controller 21, when switched to the second control mode by the mode-exchange switch, commands the driver unit 319 to rotate the supporter 112 in the pitch direction.

As such, in the present embodiment, in the case where the user U attempts to raise only the auxiliary wheel 113 of the pushcart 300 from the ground surface G so as to negotiate the step S, the user U operates the mode-exchange switch. This makes the controller 21 switch the control mode from the first control mode to the second control mode and rotate the other end portion of the supporter 112 on the side where the supporter 112 is not supported by the main wheels 111 in the pitch direction through the driver unit 319. In other words, the pushcart 300 is set in a tipping state in which only the auxiliary wheel 113 as a front wheel is raised from the ground surface G, and inverted pendulum control is performed in the second control mode.

Accordingly, the pushcart 300 brings the same advantage as the pushcart 100. In addition, the user-friendly pushcart 300 is realized because the supporter 112 is automatically rotated in the pitch direction through the operation of the mode-exchange switch.

Like the pushcart 100 or 200, the pushcart 300 may be configured such that a user manually causes the transition to the tipping state.

Figure 14:
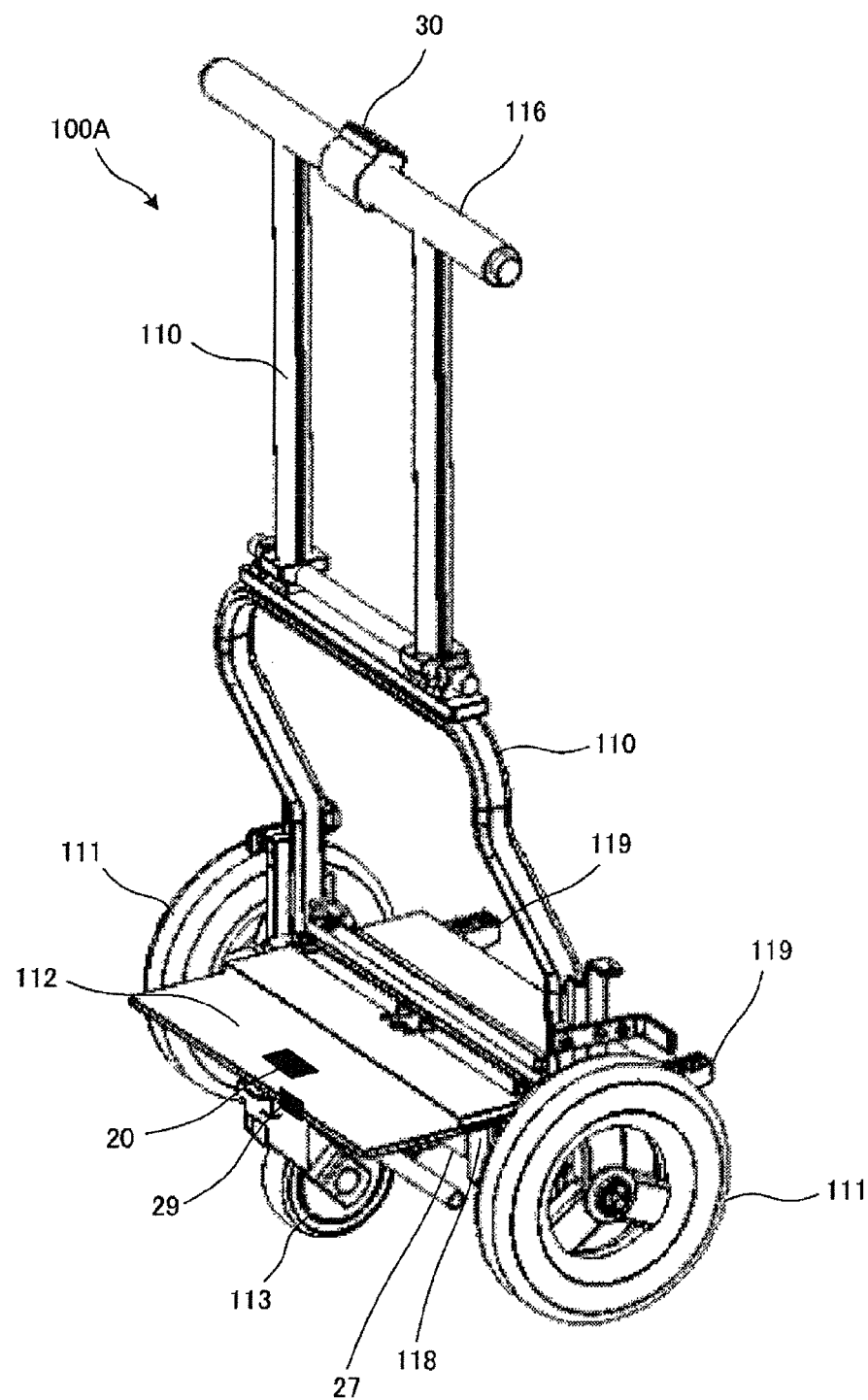
FIG. 14 is an external appearance perspective view of a pushcart 100A.
Figure 15:
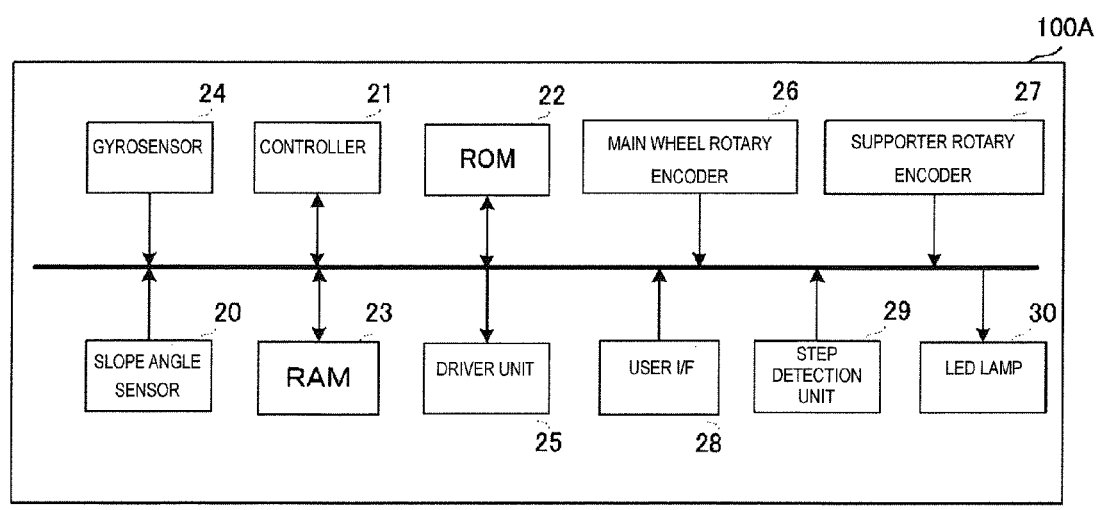
FIG. 15 is a block diagram illustrating a hardware configuration of the pushcart 100A.

Next, FIG. 14 is an external appearance perspective view of a pushcart 100A including a step detection unit. Constituent elements common to FIG. 1 are given the same reference numerals as those in FIG. 1, and descriptions thereof are omitted. FIG. 15 is a block diagram illustrating a configuration of the pushcart 100A. Constituent elements common to FIG. 5 are given the same reference numerals as those in FIG. 5, and descriptions thereof are omitted herein.

The pushcart 100A includes a step detection unit 29 and an LED lamp 30. The step detection unit 29 detects a step present in front of a user in the travelling direction. The step detection unit 29 is specifically formed of a distance measurement sensor such as a laser radar, millimeter-wave radar, ultrasonic sensor, or the like. In the case where a distance to a target object detected by the step detection unit 29 is smaller than a predetermined value (for example, 0.5 m), the controller 21 determines that there is a step. Alternatively, the step detection unit 29 may be an imaging device such as a camera or the like. In the case where a step is detected by image recognition using cameras or the like, it is also possible to measure a distance to the step from a difference in image (parallax) between two cameras. A step can be detected by a shock sensor as well. In the case where the shock sensor detects a contact with an obstacle, the controller 21 determines that the auxiliary wheel 113 is in contact with a step.

In the case where a step is detected by the step detection unit 29, the controller 21 turns on or blinks the LED lamp 30 to inform the user of the presence of the step in front in the travelling direction, thereby promoting the transition to the tipping state. However, the information of presence of a step may be given not only by a visual display using an LED lamp or the like, but also by a voice message such as "there is a step" or the like.

Further, in the case where a step is detected by the step detection unit 29, the controller 21 carries out operation to switch the control mode from the first control mode to the second control mode. Through this, the pushcart 100 will not unintendedly move due to the rotation of the main wheels 111 when the user causes the transition to the tipping state.

In the case where the driver unit 319 is provided, like the pushcart 300 shown in FIG. 13, the controller 21 may switch the control mode from the first control mode to the second control mode and carry out operation to raise the auxiliary wheel 113 from the ground surface G by the driver unit 319. In this case, the controller 21 corresponds to "switching unit" of the present disclosure.

In the case where the step is no longer detected by the step detection unit 29, that is, for example, in the case where a distance that the pushcart has moved exceeds the distance having been measured by the distance measurement sensor, the controller 21 returns to the first control mode. The distance that the pushcart has moved can be calculated from the value of the main wheel rotary encoder 26. Alternatively, the controller 21 may return to the first control mode after a predetermined time has passed or return to the first control mode when the tipping state is released by the user.

Finally, it should be understood that the descriptions of the above embodiments are merely examples and are not limiting in any way. The scope of the present disclosure is defined by the scope of the appended claims, not by the above embodiments. Further, meanings equivalent to the appended claims and all modifications within the scope of the present disclosure are intended to be included in the scope of the present disclosure.

REFERENCE SIGNS LIST

20 SLOPE ANGLE SENSOR
21 CONTROLLER
22 ROM
23 RAM
24 GYROSENSOR
25 DRIVER UNIT
26 MAIN WHEEL ROTARY ENCODER
27 SUPPORTER ROTARY ENCODER
28 USER INTERFACE
29 STEP DETECTION UNIT
30 LED LAMP
100 PUSHCART
110 MAIN BODY
111 MAIN WHEEL
112 SUPPORTER
113 AUXILIARY WHEEL
116 HOLDING PORTION
118 BLOCKING UNIT
119 SWITCHING LEVER
200 PUSHCART
211 TARGET ANGULAR VELOCITY CALCULATOR
212 TORQUE COMMAND GENERATOR
213 SLOPE ESTIMATION UNIT
214 SLOPE ANGLE DETECTION UNIT
216 SLOPE ANGULAR VELOCITY DETECTION UNIT
219 SWITCHING WIRE
300 PUSHCART
319 DRIVER UNIT
G GROUND SURFACE
S STEP
U USER

The invention claimed is:

1. A pushcart comprising:
a first wheel;
a main body that is supported in a rotatable manner in a pitch direction with respect to the first wheel;
a first driver unit that drives the first wheel;
a supporter that is supported in a rotatable manner in the pitch direction with respect to the main body or a rotational shaft of the first wheel;
a second wheel that is supported by the supporter in a rotatable manner on a front side relative to the first wheel in a travelling direction of the supporter being moved with rotation of the first wheel;
an angle change detection unit that detects an angle change in a slope angle of the main body in the pitch direction;
an intersecting angle detection unit that detects an intersecting angle formed by the main body and the supporter;
a controller having a first control mode that controls the first driver unit so that an angle change of the main body in the pitch direction becomes 0 based on output of the intersecting angle detection unit and a second control mode that controls the first driver unit so that the angle change of the main body in the pitch direction becomes 0 based on output of the angle change detection unit; and
a switching unit that switches between the first control mode and the second control mode.

2. The pushcart according to claim 1,
wherein the controller controls the first driver unit based on both the output of the intersecting angle detection unit and the output of the angle change detection unit so that the angle change of the main body in the pitch direction becomes 0 in the first control mode.

3. The pushcart according to claim 1,
wherein the switching unit is jointed to an end portion of the supporter on a side where the supporter is supported by the main body or the rotational shaft of the first wheel.

4. The pushcart according to claim 1, further comprising:
a blocking unit that prevents the supporter from rotating with an angle which is no less than a predetermined angle in the pitch direction with respect to the main body or the rotational shaft of the first wheel.

5. The pushcart according to claim 1, further comprising:
a second driver unit that actively rotates the supporter in the pitch direction,
wherein the controller commands the second driver unit to rotate the supporter in the pitch direction when switching to the second control mode is carried out by the switching unit.

6. The pushcart according to claim 1, further comprising:
a step detection unit that detects a step,
wherein the switching unit carries out switching between the first control mode and the second control mode based on a detected result by the step detection unit.

7. The pushcart according to claim 2,
wherein the switching unit is jointed to an end portion of the supporter on a side where the supporter is supported by the main body or the rotational shaft of the first wheel.

8. The pushcart according to claim 2, further comprising:
a blocking unit that prevents the supporter from rotating with an angle which is no less than a predetermined angle in the pitch direction with respect to the main body or the rotational shaft of the first wheel.

9. The pushcart according to claim 3, further comprising:
a blocking unit that prevents the supporter from rotating with an angle which is no less than a predetermined angle in the pitch direction with respect to the main body or the rotational shaft of the first wheel.

10. The pushcart according to claim 2, further comprising:
a second driver unit that actively rotates the supporter in the pitch direction,
wherein the controller commands the second driver unit to rotate the supporter in the pitch direction when switching to the second control mode is carried out by the switching unit.

11. The pushcart according to claim 3, further comprising:
a second driver unit that actively rotates the supporter in the pitch direction,
wherein the controller commands the second driver unit to rotate the supporter in the pitch direction when switching to the second control mode is carried out by the switching unit.

12. The pushcart according to claim 4, further comprising:
a second driver unit that actively rotates the supporter in the pitch direction,
wherein the controller commands the second driver unit to rotate the supporter in the pitch direction when switching to the second control mode is carried out by the switching unit.

13. The pushcart according to claim 2, further comprising:
a step detection unit that detects a step,
wherein the switching unit carries out switching between the first control mode and the second control mode based on a detected result by the step detection unit.

14. The pushcart according to claim 3, further comprising:
a step detection unit that detects a step,
wherein the switching unit carries out switching between the first control mode and the second control mode based on a detected result by the step detection unit.

15. The pushcart according to claim 4, further comprising:
a step detection unit that detects a step,
wherein the switching unit carries out switching between the first control mode and the second control mode based on a detected result by the step detection unit.

16. The pushcart according to claim 5, further comprising:
a step detection unit that detects a step,
wherein the switching unit carries out switching between the first control mode and the second control mode based on a detected result by the step detection unit.

* * * * *